(12) United States Patent
Kim

(10) Patent No.: US 10,625,573 B2
(45) Date of Patent: *Apr. 21, 2020

(54) THERMAL MANAGEMENT SYSTEM FOR VEHICLE

(71) Applicants: Hyundai Motor Company, Seoul (KR); Kia Motors Corporation, Seoul (KR)

(72) Inventor: Jae Yeon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

This patent is subject to a terminal disclaimer.

(21) Appl. No.: 15/945,911

(22) Filed: Apr. 5, 2018

(65) Prior Publication Data

US 2019/0168578 A1    Jun. 6, 2019

(30) Foreign Application Priority Data

Dec. 4, 2017    (KR) ........................ 10-2017-0164947

(51) Int. Cl.
*B60H 1/22*    (2006.01)
*B60H 1/32*    (2006.01)
(Continued)

(52) U.S. Cl.
CPC ......... *B60H 1/323* (2013.01); *B60H 1/00278* (2013.01); *B60H 1/00328* (2013.01);
(Continued)

(58) Field of Classification Search
CPC ................ B60H 1/32284; B60H 1/323; B60H 2001/00928; B60H 2001/00949; B60H 1/00328
See application file for complete search history.

(56) References Cited

U.S. PATENT DOCUMENTS 6,616,059 B2 *    9/2003    Sabhapathy ............. B60H 1/04
                                                  237/12.3 B
6,640,889 B1 *    11/2003    Harte .................. B60H 1/00885
                                                  165/202

(Continued)

FOREIGN PATENT DOCUMENTS

JP          5206971 B2       6/2013
JP          2014196078 A    10/2014
KR          101786670 B1    10/2017

*Primary Examiner* — Filip Zec
(74) *Attorney, Agent, or Firm* — Mintz Levin Cohn Ferris Glovsky and Popeo, P.C.; Peter F. Corless

(57) ABSTRACT

A thermal management system for a vehicle is provided. The thermal management system f includes a cooling apparatus that circulates a coolant cooled in a radiator through a coolant line to cool a driving device in a vehicle. A main centralized energy (CE) module is connected to the cooling apparatus via the coolant line, selectively heat-exchanges thermal energy generated during a condensation and evaporation of the refrigerant circulating the inside with a coolant, and respectively supplies the coolant of low temperature or high temperature to a cooling heat exchanger or a heating heat exchanger. A sub CE module is connected to the cooling apparatus via the coolant line, selectively heat-exchanges thermal energy generated during a condensation and evaporation of the refrigerant circulating the inside with a coolant, and supplies the coolant of low temperature to a controller provided in the vehicle.

11 Claims, 2 Drawing Sheets

(51) Int. Cl.
*B60H 1/00* (2006.01)
*B60H 1/14* (2006.01)

(52) U.S. Cl.
CPC ..... *B60H 1/00335* (2013.01); *B60H 1/00885* (2013.01); *B60H 1/00899* (2013.01); *B60H 1/143* (2013.01); *B60H 1/22* (2013.01); *B60H 1/3213* (2013.01); *B60H 1/32284* (2019.05); *B60H 2001/00928* (2013.01); *B60H 2001/00949* (2013.01)

(56) References Cited

U.S. PATENT DOCUMENTS

| | | | |
|---|---|---|---|
| 6,971,246 B2 * | 12/2005 | Kurata | B60H 1/00328 |
| | | | 62/196.4 |
| 9,707,823 B2 * | 7/2017 | Feuerecker | B60H 1/00921 |
| 2016/0023532 A1 * | 1/2016 | Gauthier | B60L 50/66 |
| | | | 62/243 |

* cited by examiner

THERMAL MANAGEMENT SYSTEM FOR VEHICLE

CROSS-REFERENCE TO RELATED APPLICATION

This application claims priority to and the benefit of Korean Patent Application No. 10-2017-0164947 filed in the Korean Intellectual Property Office on Dec. 4, 2017, the entire contents of which are incorporated herein by reference.

BACKGROUND

(a) Field of the Invention

The present invention relates to a thermal management system for a vehicle, and more particularly, to a thermal management system for a vehicle that enables a cooling of a control device along with a cooling and a heating of an indoor in an autonomous vehicle.

(b) Description of the Related Art

In general, an air-conditioning system that adjusts an indoor temperature of the vehicle is provided in the vehicle. The air conditioning system maintains an interior temperature of the vehicle at an appropriate temperature regardless of a change in an outside temperature and is configured to heat or cool the interior of the vehicle by a heat exchange using an evaporator in a process in which a refrigerant discharged by driving a compressor passes through a condenser, a receiver drier, an expansion valve, and an evaporator and then the refrigerant is circulated to the compressor again.

In other words, in a cooling mode in summer or during warmer temperatures, in the air conditioning system, a high-temperature and high-pressure gas phase refrigerant compressed by the compressor is condensed through the condenser and then is evaporated in the evaporator through the receiver drier and the expansion valve to decrease an interior temperature and humidity. On the other hand, with the development of the autonomous vehicle, and a radar, a LIDAR, a GPS, etc. required for the auto driving, various sensors and a controller that operates the sensors are mounted in a trunk compartment of the vehicle.

However, in the above-described autonomous vehicle, as a separate cooling system for cooling the controller of which a calorific value is substantial is required along with the air-conditioning system for cooling or heating the interior of the vehicle, there are drawbacks that a cost increases and it is difficult to secure a space for installing the cooling system inside the vehicle. Additionally, a size and a weight of a cooling module disposed in front of the vehicle are increased, and a layout of connection pipes supplying a refrigerant or a coolant to the air-conditioning system, the cooling system of the control device, and a battery cooling system is complex inside the engine compartment.

The above information disclosed in this section is merely for enhancement of understanding of the background of the invention and therefore it may contain information that does not form the prior art that is already known in this country to a person of ordinary skill in the art.

SUMMARY

The present invention provides a thermal management system for a vehicle that exchanges heat for thermal energy generated from the refrigerant during a condensation and an evaporation of the refrigerant in the autonomous vehicle with the refrigerant, adjusts the interior temperature of the vehicle using the heat-exchanged coolant of low temperature or high temperature, and efficiently cools the controller.

A thermal management system for a vehicle according to an exemplary embodiment of the present invention may include a cooling apparatus configured to circulate a coolant cooled in a radiator through a coolant line to cool a driving device provided in a vehicle; a main centralized energy (CE) module connected to the cooling apparatus through the coolant line, configured to selectively heat-exchange thermal energy generated during a condensation and evaporation of the refrigerant circulating the inside with a coolant, and respectively supply the coolant of low temperature or high temperature to a cooling heat exchanger or a heating heat exchanger; and a sub CE module connected to the cooling apparatus through the coolant line, configured to selectively heat-exchange thermal energy generated during a condensation and evaporation of the refrigerant circulating the inside with a coolant, supply the coolant of low temperature to a controller provided in the vehicle.

The main CE module may include a first compressor configured to compress the refrigerant; a first condenser connected to the first compressor through a first refrigerant line and configured to heat-exchange the compressed coolant supplied from the first compressor with the coolant supplied inside through the coolant line to be condensed; a first expansion valve connected to the first condenser through the first refrigerant line and that expands the refrigerant; and a first evaporator connected to the first expansion valve through the first refrigerant line, connected to the cooling heat exchanger circulating the coolant through the cooling line, that evaporates the refrigerant supplied from the first expansion valve with the coolant received through the air-conditioning line through the heat exchange, and supplies the evaporated refrigerant to the first compressor.

The first condenser may be connected to the heating heat exchanger through a heating line and configured to supply the coolant of which the temperature increases while condensing the refrigerant to the heating heat exchanger through the heating line. A third water pump that circulates the coolant to the heating heat exchanger and the first condenser may be disposed in the heating line. The first evaporator may be configured to supply the coolant of which the temperature decreases while evaporating the refrigerant through the heat exchange with the coolant to the cooling heat exchanger through the cooling line. A second water pump that circulates the coolant to the cooling cooler and the first evaporator may be disposed at the cooling line.

The sub CE module may include a second condenser connected to the second compressor through a second refrigerant line and configured to heat-exchange the compressed refrigerant supplied from the second compressor with the coolant supplied inside through the coolant line to be condensed; a second expansion valve connected to the second condenser through the second refrigerant line and that expands the refrigerant; and a second evaporator connected to the second expansion valve through the second refrigerant line, connected to the controller via a connecting line, that evaporates the refrigerant supplied from the second expansion valve with the coolant received through the connecting line through the heat exchange, and supplies the evaporated refrigerant to the second compressor.

The second evaporator may be configured to supply the coolant of which the temperature decreases while evaporating the refrigerant through the heat exchange with the coolant to the controller via the connecting line. A fourth water pump may be disposed in the connecting line. The cooling apparatus may further include a first water pump disposed in the coolant line and configured to circulate the coolant cooled in the radiator. The refrigerant circulating in the main CE module and the sub CE module may be R152-a, R744, or R290.

As above-described, the thermal management system for the vehicle according to an exemplary embodiment of the present invention may selectively heat-exchange the thermal energy generated from the refrigerant during the condensation and evaporation of the refrigerant circulated in the autonomous vehicle with the coolant, adjust the interior temperature of the vehicle using the heat-exchanged coolant of low temperature or high temperature, and supply the thermal energy of low temperature generated during the evaporation of the refrigerant to the controller through the air for being efficiently cooled, and efficiently cooling the controller, thereby simplifying the entire system and the layout of the connection pipe circuiting the coolant.

Additionally, since the present invention applies the main CE module and the sub CE module in which the coolant is circuited inside to configure the entire system, a production cost reduction and a weight reduction are possible through the modularization of the device, and a space utilization may be improved. Since the present invention uses R152-a, R744, or R290 as the refrigerant of low cost and high performance, the operation efficiency may be improved, and the occurrence of a noise, a vibration, and a motion instability may be prevented compared with a conventional air-conditioner.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DESCRIPTION OF SYMBOLS

Figure 1:
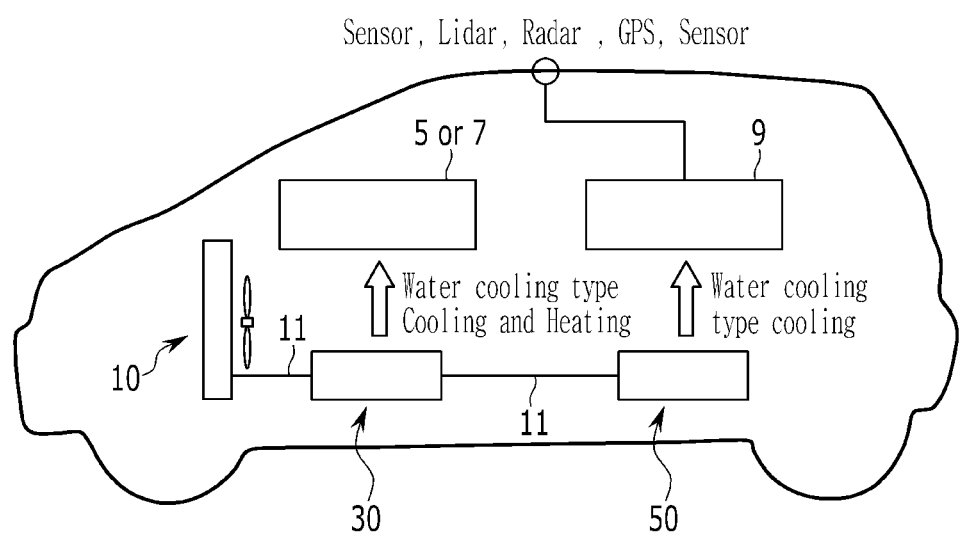
FIG. 1 is a schematic view of a thermal management system for a vehicle according to an exemplary embodiment of the present invention.

3: driving device
5: cooling heat exchanger
5a: cooling line
5b: second water pump
7: heating heat exchanger
7a: heating line
7b: third water pump
9: controller
9a: connecting line
9b: fourth water pump
10: cooling apparatus
11: coolant line
13: radiator
15: first water pump
30: main CE module
31: first refrigerant line
33: first compressor
35: first condenser
37: first expansion valve
39: first evaporator
50: sub CE module
51: second refrigerant line
53: second compressor
55: second condenser
57: second expansion valve
59: second evaporator

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings. Exemplary embodiments disclosed in the present specification and the constructions depicted in the drawings are only the preferred embodiments of the present invention, and do not cover the entire scope of the present invention. Therefore, it will be understood that there may be various equivalents and variations at the time of the application of this specification.

The unrelated parts to the description of the exemplary embodiments are not shown to make the description clear and like reference numerals designate like element throughout the specification. Further, the sizes and thicknesses of the configurations shown in the drawings are provided selectively for the convenience of description, so that the present invention is not limited to those shown in the drawings and the thicknesses are exaggerated to make some parts and regions clear.

Figure 2:
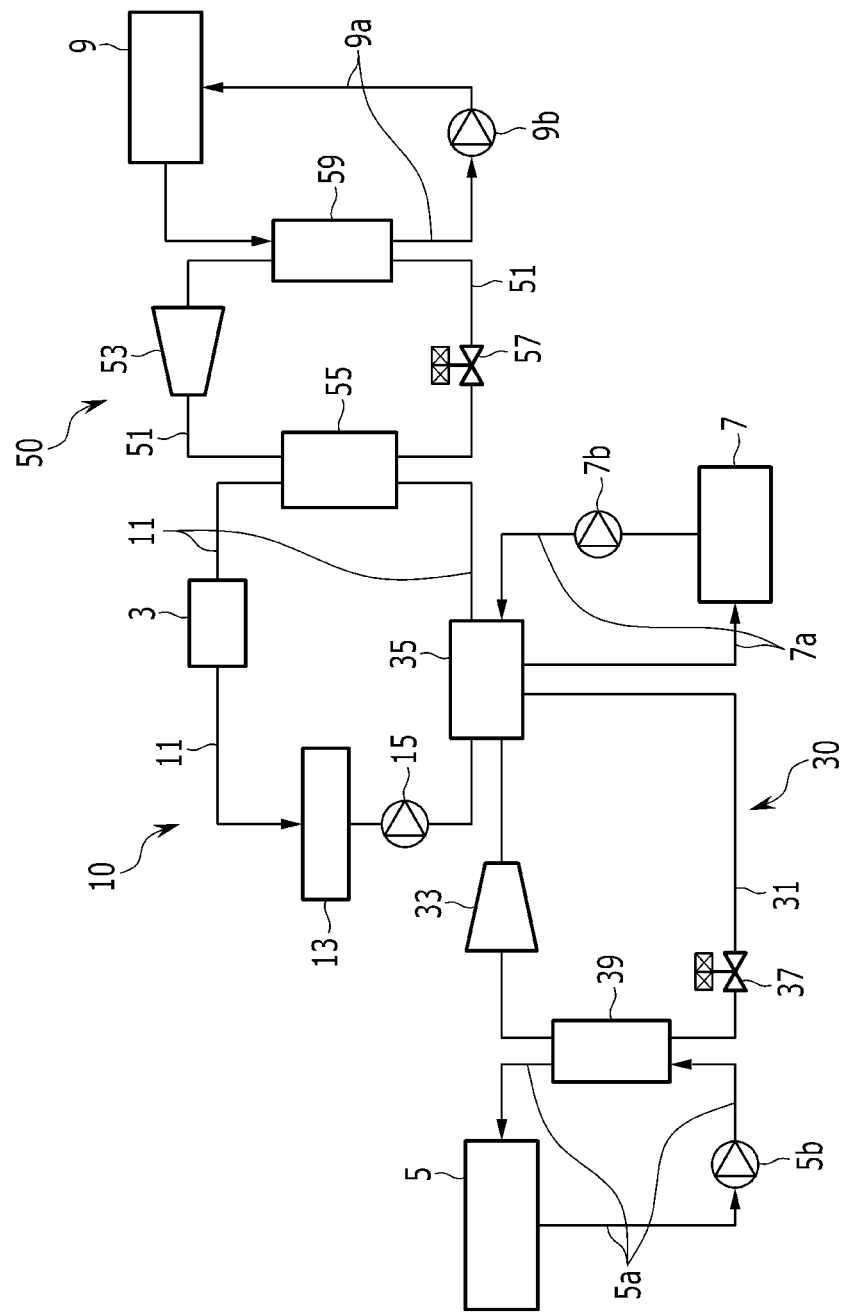
FIG. 2 is a block diagram of a thermal management system for a vehicle according to an exemplary embodiment of the present invention.

FIG. 1 is a schematic view of a thermal management system for a vehicle according to an exemplary embodiment of the present invention, and FIG. 2 is a block diagram of a thermal management system for a vehicle according to an exemplary embodiment of the present invention. Referring to FIG. 1 and FIG. 2, a thermal management system for a vehicle according to an exemplary embodiment of the present invention is applied to an autonomous vehicle.

In the vehicle, a cooling apparatus 10 is provided to cool a driving device 3 including an engine, a motor, and a battery including a fuel cell. The cooling apparatus 10 may be disposed in front of the vehicle (e.g., a front portion of the vehicle) and may be configured to circulate the coolant cooled in the radiator 13 through a coolant line 11, thereby cooling the driving device 3. In particular, the cooling apparatus 10 may further include a first water pump 15 provided in the coolant line 11 and configured to circulate the coolant cooled in the radiator 13. A radar, a LIDAR, a global positioning system (GPS) required for the autonomous driving, and various sensors are provided within the vehicle and a controller 9 is configured to operate the various components.

Particularly, the thermal management system for the vehicle according to an exemplary embodiment of the present invention performs the cooling and the heating of the vehicle, and may further include a main CE module 30 and a sub CE module 50 to cool the controller 9. First, the main CE module 30 may be connected to the cooling apparatus 10 via the coolant line 11. The main centralized energy (CE) module 30 may be configured to selectively heat-exchange a thermal energy generated during the condensation and the evaporation of the refrigerant circulating the inside with the coolant and may be configured to supply the heat-exchanged coolant of low temperature or high temperature to the cooling heat exchanger 5 or the heating heat exchanger 7.

The refrigerant may be R152-a, or R744, or R290, having relatively low cost and high performance. In other words, the coolant of low temperature may be supplied to the cooling heat exchanger 5 through a cooling line 5a, and the coolant of high temperature may be connected to the heating heat exchanger 7 via a heating line 7a. The cooling heat exchanger 5 and the heating heat exchanger 7 may be provided in the air-conditioning system of the vehicle.

The main CE module 30 may include a first compressor 33, a first condenser 35, a first expansion valve 37, and a first evaporator 39 connected via a first refrigerant line 31. First, the first compressor 33 may be configured to compress the refrigerant exhausted from the first evaporator 39. The first condenser 35 may be connected to the first compressor 33 through the first refrigerant line 31. The first condenser 35 may be configured to heat-exchange the compressed refrigerant supplied from the first compressor 33 with the coolant supplied to the inside through the coolant line 11 to be condensed.

In particular, the first condenser 35 may be connected to the heating heat exchanger 7 via the heating line 7a. Accordingly, the first condenser 35 may be configured to heat-exchange the received refrigerant with the coolant received inside through the heating line 7a and the coolant line 11 to be condensed and supply the thermal energy during the condensation of the refrigerant to the coolant, thereby increasing the temperature of the coolant. When the heating of the vehicle is required, the coolant of which the temperature is increased may be supplied to the heating heat exchanger 7 through the heating line 7a. In addition, a third water pump 7b may be configured to circulate the coolant to the heating heat exchanger 7 and the first condenser 35 and may be disposed in the heating line 7a.

In the present exemplary embodiment, the first expansion valve 37 may be connected to the first condenser 35 via the first refrigerant line 31 and may be configured to receive the coolant passing through the first condenser 35 to be expanded. The first expansion valve 37 may be constructed mechanically or electronically. Additionally, the first evaporator 39 may be connected to the first expansion valve 37 via the first refrigerant line 31. The first evaporator 39 may be connected to the cooling heat exchanger 5 circulated with the coolant through the cooling line 5a.

Accordingly, the first evaporator 39 may be configured to evaporate the refrigerant supplied from the first expansion valve 37 with the coolant received through the cooling line 5a through the heat exchange and supply the thermal energy of low temperature generated during the evaporation of the refrigerant to the coolant to decrease the temperature of the coolant. When the cooling of the vehicle is required, the coolant of low temperature of which the temperature decreases may be supplied to the cooling heat exchanger 5 through the cooling line 5a.

Particularly, a second water pump 5b may be disposed in the cooling line 5a and may be configured to circulate the coolant to the cooling heat exchanger 5 and the first evaporator 39. In other words, while evaporating the refrigerant with the coolant through the heat exchange, the first evaporator 39 may be configured to supply the coolant of which the temperature decreases to the cooling heat exchanger 5 during the operation of the cooling mode of the vehicle. The coolant exhausted from the first evaporator 39 may also be supplied to the first compressor 33 through the first refrigerant line 31.

The above-configured main CE module 30 may be formed in a modular structure in which all constituent elements are disposed inside the housing and connected through a relatively short connection pipe forming the first refrigerant line 31. In the present exemplary embodiment, the sub CE module (50: Sub Centralized Energy Module) is connected to the cooling apparatus 10 through the coolant line 11.

The sub CE module 50 may be configured to selectively heat-exchange the thermal energy generated when the refrigerant which is circulated in the sub CE module 50 is condensed and evaporated with the coolant. The sub CE module 50 may further be configured to supply a low-temperature coolant of which the heat-exchanged to the controller 9 mounted within the vehicle. The coolant may be R152-a, or R744, or R290 of low cost and high performance. In other words, the low-temperature coolant cooled through heat-exchanged with the refrigerant may be supplied to the controller 9 through the connecting line 9a, thereby efficiently cooling the controller 9.

The sub CE module 50 may include a second compressor 53, a second condenser 55, a second expansion valve 57, and a second evaporator 59 that are connected via a second refrigerant line 51. First, the second compressor 53 may be configured to compress the refrigerant exhausted from the second evaporator 59. The second condenser 55 may be connected to the second compressor 53 via the second refrigerant line 51. The second condenser 55 may be configured to heat-exchange and condense the compressed refrigerant supplied from the second compressor 53 with the coolant supplied to the inside through the coolant line 11.

The second expansion valve 57 may be connected to the second condenser 55 via the second refrigerant line 51, and may be configured to receive and expand the refrigerant passing through the second condenser 55. The second expansion valve 57 may be configured mechanically or electronically. Additionally, the second evaporator 59 may be connected to the second expansion valve 57 via the second refrigerant line 51. The second evaporator 59 may be connected to the controller 9, through which the coolant is circulated, via the connecting line 9a.

Accordingly, the second evaporator 59 may be configured to evaporate the refrigerant supplied from the second expansion valve 57 with the coolant received through the connecting line 9*a* through the heat exchange and supply the thermal energy of low temperature generated during the evaporation of the refrigerant to the coolant to decrease the temperature of the coolant. The low-temperature coolant may be supplied to the controller 9 to cool the controller 9. A fourth water pump 9*b* configured to circulate the coolant to the controller 9 and the second evaporator 59 may be provided in the connecting line 9*a*. The coolant circulating along the connecting line 9*a* through the operation of the fourth water pump 9*b* may be supplied to the controller 9 in a cooled state while passing through the second evaporator 59, and thus, the controller 9 may be further efficiency cooled.

The above-configured sub CE module 50 may be formed in a modular structure in which all constituent elements are disposed inside the housing and connected via a relatively short connection pipe forming the second refrigerant line 51. On the other hand, in the present exemplary embodiment, the cooling heat exchanger 5, the heating heat exchanger 7, the controller 9, the first and second condenser 35 and 55, and the first and second evaporator 39 and 59 may be all formed of a water cooling type heat exchanger.

Accordingly, as the above-configured thermal management system for the vehicle according to an exemplary embodiment of the present invention selectively heat-exchanges the thermal energy generated from the refrigerant during the condensation and evaporation of the refrigerant circulated at the main and sub CE module 30 and 50 in the autonomous vehicle with the coolant, adjusts the interior temperature of the vehicle using the heat-exchanged coolant of low temperature or high temperature, and supplies the thermal energy of low temperature generated during the evaporation of the refrigerant to the controller through the air for being efficiently cooled, and efficiently cools the controller, thereby simplifying the entire system and the layout of the connection pipe circuiting the coolant.

Additionally, since the present invention applies the main CE module 30 and the sub CE module 50 in which the coolant is circuited inside to configure the entire system, a production cost reduction and a weight reduction are possible through the modularization of the device are possible, and a space utilization may be improved. Since the present invention uses R152-a, R744, or R290 as the refrigerant of low cost and high performance, the operation efficiency may be improved, and the occurrence of a noise, a vibration, and a motion instability may be prevented compared with a conventional air-conditioner.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A thermal management system for a vehicle, comprising:
   a cooling apparatus configured to circulate a coolant cooled in a radiator through a coolant line to cool a driving device provided in the vehicle;
   a main centralized energy (CE) module connected to the cooling apparatus via the coolant line and configured to selectively heat-exchange thermal energy generated during a condensation and evaporation of a first refrigerant circulating therein with the coolant and respectively supply the coolant of a first low temperature or a high temperature to at least a cooling heat exchanger or a heating heat exchanger; and
   a sub CE module connected to the cooling apparatus via the coolant line and configured to selectively heat-exchange thermal energy generated during a condensation and evaporation of a second refrigerant circulating therein with the coolant and supply the coolant of a second low temperature to a controller provided in the vehicle.

2. Thermal management system for the vehicle of claim 1, wherein the main CE module includes:
   a first compressor configured to compress the first refrigerant;
   a first condenser connected to the first compressor via a first refrigerant line and configured to heat-exchange the compressed first refrigerant supplied from the first compressor with the coolant supplied therein through the coolant line to be condensed;
   a first expansion valve connected to the first condenser through the first refrigerant line and configured to expand the first refrigerant; and
   a first evaporator connected to the first expansion valve via the first refrigerant line, connected to the cooling heat exchanger circulating the coolant through the cooling line, evaporating the first refrigerant supplied from the first expansion valve with the coolant received through the air-conditioning line through the heat exchange, and supplying an evaporated refrigerant to the first compressor.

3. Thermal management system for the vehicle of claim 2, wherein the first condenser is connected to the heating heat exchanger via a heating line and configured to supply the coolant of which the temperature increases while condensing the first refrigerant to the heating heat exchanger through the heating line.

4. Thermal management system for the vehicle of claim 3, wherein a third water pump configured to circulate the coolant to the heating heat exchanger and the first condenser is provided in the heating line.

5. Thermal management system for the vehicle of claim 2, wherein the first evaporator is configured to supply the coolant of which the temperature decreases while evaporating the first refrigerant through the heat exchange with the coolant to the cooling heat exchanger through the cooling line.

6. Thermal management system for the vehicle of claim 2, wherein a second water pump configured to circulate the coolant to the cooling cooler and the first evaporator is provided at the cooling line.

7. Thermal management system for the vehicle of claim 1, wherein the sub CE module includes:
   a second compressor configured to compress the coolant;
   a second condenser connected to the second compressor via a second refrigerant line and configured to heat-exchange the compressed coolant supplied from the second compressor with the coolant supplied therein through the coolant line to be condensed;
   a second expansion valve connected to the second condenser through the second refrigerant line and expanding the second refrigerant; and
   a second evaporator connected to the second expansion valve via the second refrigerant line, connected to the controller via a connecting line, configured to evaporate the second refrigerant supplied from the second expansion valve with the coolant received through the connecting line through the heat exchange, and supply the evaporated refrigerant to the second compressor.

8. Thermal management system for the vehicle of claim 7, wherein the second evaporator is configured to supply the coolant of which the temperature decreases while evaporating the second refrigerant through the heat exchange with the coolant to the controller through the connecting line.

9. Thermal management system for the vehicle of claim 7, wherein a fourth water pump is provided in the connecting line.

10. Thermal management system for the vehicle of claim 1, wherein the cooling apparatus further includes a first water pump provided in the coolant line and configured to circulate the coolant cooled in the radiator.

11. Thermal management system for the vehicle of claim 1, wherein the first refrigerant circulating in the main CE module and the second refrigerant circulating in the sub CE module is R152-a, R744, or R290.

* * * * *